US012146644B2

(12) United States Patent
Liang et al.

(10) Patent No.: US 12,146,644 B2
(45) Date of Patent: Nov. 19, 2024

(54) TAPE MEASURE ATMOSPHERE LAMP

(71) Applicant: BINOVO MANUFACTURING CO., LTD, Guangdong (CN)

(72) Inventors: Pang Liang, Guangdong (CN); Liangbin Ling, Guangdong (CN)

(73) Assignee: BINOVO MANUFACTURING CO., LTD, Guangdong (CN)

( * ) Notice: Subject to any disclaimer, the term of this patent is extended or adjusted under 35 U.S.C. 154(b) by 0 days.

(21) Appl. No.: 18/212,193

(22) Filed: Jun. 21, 2023

(65) Prior Publication Data

US 2024/0230077 A1 Jul. 11, 2024

(30) Foreign Application Priority Data

Jan. 6, 2023 (CN) .......................... 202320073404.8

(51) Int. Cl.
*F21V 27/00* (2006.01)
*F21S 4/24* (2016.01)

(52) U.S. Cl.
CPC ................ *F21V 27/00* (2013.01); *F21S 4/24* (2016.01)

(58) Field of Classification Search
CPC .................................... F21V 27/00; F21S 4/24
See application file for complete search history.

(56) References Cited

U.S. PATENT DOCUMENTS

| | | | | |
|---|---|---|---|---|
| 6,550,155 B1 * | 4/2003 | Hsu | ...................... | G01B 3/1005 242/395 |
| 8,124,988 B2 | 2/2012 | Peng | | |
| 10,026,277 B2 * | 7/2018 | Huo | .................... | B65H 75/4471 |
| 11,130,653 B1 | 9/2021 | Russo | | |
| 11,408,568 B2 | 8/2022 | Wu | | |
| 11,560,989 B1 * | 1/2023 | Herman | ................ | F21V 15/012 |
| 11,732,849 B1 * | 8/2023 | Tagle | ..................... | G08B 5/006 362/249.01 |

(Continued)

FOREIGN PATENT DOCUMENTS

| | | |
|---|---|---|
| CN | 207421938 U | 5/2018 |
| CN | 209655093 U | 11/2019 |

(Continued)

OTHER PUBLICATIONS

EP Extend Search Report of the counterpart EP Application No. 23188839.7 issued on Jan. 26, 2024.

(Continued)

*Primary Examiner* — Tsion Tumebo
(74) *Attorney, Agent, or Firm* — Samson G. Yu

(57) ABSTRACT

Some embodiments of the present disclosure a tape measure atmosphere lamp. wherein a housing assembly, and a rocker assembly, a base, a roller, a light strip and a circuit module that are all mounted in the housing assembly, where the rocker assembly is hinged to the base, the base is fixedly connected with the roller, the roller is rotationally connected with the housing assembly, the light strip is wound in a circumferential direction of the roller, and the light strip is electrically connected with the circuit module. The rocker assembly is turned over relative to the base, such that the rocker assembly can protrude out of or get hidden in the housing assembly. The base and the roller can be driven to rotate by rotating the rocker assembly, such that the light strip is extended or retracted relative to the housing assembly.

17 Claims, 11 Drawing Sheets

(56) References Cited

U.S. PATENT DOCUMENTS

| | | | |
|---|---|---|---|
| 11,859,783 B2 | 1/2024 | Wu | |
| 2003/0156405 A1* | 8/2003 | Kim | E01F 9/559 |
| | | | 362/240 |
| 2004/0032741 A1* | 2/2004 | Tai | F21L 4/00 |
| | | | 362/258 |
| 2004/0035971 A1* | 2/2004 | Li | G01B 3/1005 |
| | | | 242/396.6 |
| 2007/0107248 A1* | 5/2007 | Jones | G01B 3/1041 |
| | | | 33/760 |
| 2015/0108264 A1 | 4/2015 | Hawkins | |
| 2019/0195483 A1* | 6/2019 | Workman | F21V 27/00 |
| 2022/0102949 A1* | 3/2022 | Miller | B65H 75/364 |
| 2024/0084983 A1 | 3/2024 | Wu | |

FOREIGN PATENT DOCUMENTS

| | | | | |
|---|---|---|---|---|
| CN | 113819408 | A | * | 12/2021 |
| CN | 215929270 | U | | 3/2022 |
| CN | 217004280 | U | | 7/2022 |
| CN | 217763129 | U | * | 11/2022 |
| EP | 2458026 | A | | 9/2009 |
| EP | 3816033 | A1 | | 5/2021 |
| GB | 2558945 | A | | 7/2018 |
| JP | 3074838 | U | | 1/2001 |
| WO | 2006042271 | A2 | | 4/2006 |

OTHER PUBLICATIONS

Patent Evaluation Report of the counterpart CN Application No. 202320073404.8 issued on Sep. 25, 2023.

\* cited by examiner

TAPE MEASURE ATMOSPHERE LAMP

CROSS-REFERENCE TO RELATED APPLICATIONS

The present disclosure claims priority Chinese Patent Application No. 202320073404.8 (application publication number CN219063366U), filed on Jan. 6, 2023 and entitled "Tape measure atmosphere lamp".

TECHNICAL FIELD

The present disclosure relates to a technical field of lamps, and in particular to a tape measure atmosphere lamp.

BACKGROUND

Typically, a light strip is used for decoration or illumination, which adds infinite joy and festival atmosphere to various festivals, such as the Christmas, the Valentine's Day, and the National Day. During outdoor activities, people also like to suspend the light strip to create a joyful atmosphere. The light strip is usually wound into a ball or around a reel before being stored. However, such a storage way is laborious and inconvenient. In the case of a tape measure type lamp in the art known to inventors, a light strip is made into a structure of a tape measure, a handle is arranged on the tape measure type lamp, and the handle is rotated to unwind or wind the light strip, thereby greatly improving convenience of winding of the light strip. However, the tape measure type lamp has a relatively single function. It can only be used after the light strip is unwound, and does not have an illumination function in a wound state of the light strip.

SUMMARY

An objective of the present disclosure is to solve the problems that an existing tape measure type lamp is single in function and cannot satisfy diversified requirements of users. The present disclosure provides a multi-functional tape measure atmosphere lamp, which not only can unwind a light strip to create an atmosphere, but also can be used as a camping lamp under the condition that the light strip is wound.

In order to achieve the above objective, the present disclosure employs the technical solutions as follows: A tape measure atmosphere lamp includes a housing assembly, and a rocker assembly, a base, a roller, a light strip and a circuit module, and the rocker assembly, the base, the roller, the light strip and the circuit module are mounted in the housing assembly, where the rocker assembly is hinged to the base, the base is fixedly connected with the roller, the roller is rotationally connected with the housing assembly, the light strip is wound in a circumferential direction of the roller, and the light strip is electrically connected with the circuit module. The rocker assembly is turned over relative to the base, such that the rocker assembly can protrude out of or get hidden in the housing assembly. The base and the roller can be driven to rotate by rotating the rocker assembly, such that the light strip is extended or retracted relative to the housing assembly.

In the above solution, by winding the light strip around the roller, the base can be driven to rotate by the rocker assembly, and the base drives the roller to rotate, so as to unwind or wind the light strip. In an unwound state of the light strip, a required atmosphere feeling can be created. In a wound state of the light strip, the light strip can also be stored in the housing assembly, such that an occupied space is saved, and winding is convenient. The rocker assembly can also be turned over relative to the base. When the rocker assembly is turned over by different angles relative to the base and is located in different positions, different functions can be achieved. When the rocker assembly is turned over to a position in which the rocker assembly is perpendicular to the base, the rocker assembly can be used for suspending the tape measure atmosphere lamp. A bottom of the housing assembly is configured to be in a light-transmitting structure, such that when the light strip is in the wound state, a lighting effect can also be achieved, and the ambient lamp can serve as a camping lamp. When the rocker assembly is turned over to the other end of the base, the rocker assembly can get hidden in the housing assembly, such that the rocker assembly is also stored in the housing assembly, and the tape measure atmosphere lamp is more convenient to carry.

In some embodiments, the rocker assembly includes a rocker and a handle, where the handle is provided on the rocker, a mounting recess is provided in the base, and the rocker is mounted in the mounting recess and is hinged to the base. The rocker assembly can be conveniently rotated through the handle so as to drive the base to enable the roller to rotate along with rotation, thereby unwinding and winding the light strip. Moreover, the rocker can be conveniently turned over relative to the base through the handle. When the rocker is perpendicular to the base, the rocker can serve as a hanging hook to achieve a suspending function. The rocker is placed in the mounting recess. Specifically, the rocker occupies only half of the mounting recess, and therefore, when the rocker assembly is turned over relative to the base, the rocker can be turned over by 180° relative to the base to the greatest extent, such that the rocker assembly is turned over from one end of the mounting recess to the other end of the mounting recess. On this basis, the larger a contact area of the rocker and the base is, the more conveniently the rocker assembly drives the base to rotate when rotating.

In some embodiments, a side wall of the mounting recess is attached with the rocker. Shapes and sizes of the mounting recess and the rocker are correspondingly limited, such that the side wall of the mounting recess is attached with the rocker. After the rocker is turned over by a certain angle relative to the base, the relative positions of the rocker and the base can keep unchanged by means of the side wall of the mounting recess being attached with the rocker. The rocker can be turned over relative to the base only by manually applying force to the rocker, such that the rocker can be conveniently maintained in a state in which the rocker is perpendicular to the base, and the rocker can serve as a hanging hook for hanging the tape measure type ambient lamp. Certainly, within a cognitive range of those skilled in the art, a limiting component can also be disposed at the position, where the rocker and the base are located, of the mounting recess and perform limitation when the rocker is perpendicular to the base, thereby maintaining the perpendicular state between the rocker and the base.

In some embodiments, the tape measure atmosphere lamp includes a rotational shaft, and the rocker is hinged to the base at a middle of the base by means of the rotational shaft. The rotational shaft is penetrated the base and the rocker in sequence, such that rotational connection between the rocker and the base is achieved. An end of the rocker is hinged with the middle of the base. By taking the middle of the base as a boundary, when the rocker is located at one end of the mounting recess and is located on the same plane with the base, the tape measure atmosphere lamp is in a first usage state. In this case, the handle protrudes out of the housing assembly, and rotating the handle can drives the base and the roller to rotate by the rocker, thereby unwinding or winding the light strip. The rocker is turned over, such that the rocker is erected, and the rocker and the base are in the perpendicular state. In this case, the rocker is in a second usage state, the tape measure atmosphere lamp can be suspended to serve as a camping lamp. The rocker continues being turned over, and the rocker is located at the other end of the mounting recess and is located on the same plane with the base. In this case, the tape measure atmosphere lamp is in the wound state, the handle is stored in the housing assembly, and the whole tape measure atmosphere lamp is in a complete wound state. Certainly, when the light strip is in the unwound state, the handle can also be stored in the housing assembly.

In some embodiments, two first limiting portions are symmetrically disposed in the mounting recess with respect to a center of a centerline of the mounting recess, the rocker is of an arc-shaped rod structure, a second limiting portion corresponding to the first limiting portions is disposed on the rocker, and the handle is located at the second limiting portion. The two first limiting portions are respectively located at two opposite ends of the mounting recess. When the handle is located at one of the first limiting portions, the handle protrudes out of the housing assembly. When the handle is located at the other of the first limiting portions, the handle gets hidden in the housing assembly. The second limiting portion disposed on the rocker is abutted against and limits the first limiting portions on the mounting recess, such that the handle is convenient to rotate and capable of getting hidden.

In some embodiments, a through hole for hiding the handle after the handle drives the rocker to be turned over is provided at the first limiting portion away from the handle. The handle is inserted into the through hole, such that the handle gets hidden in the housing assembly.

In some embodiments, the base includes a mounting plate and a plurality of mounting supports; and the plurality of mounting supports are provided at a bottom of the mounting plate. The mounting recess is provided in the mounting plate, and the rocker is hinged to the mounting plate. A plurality of mounting holes are provided in an inner side of a bottom of the roller, the base is connected with the roller by means of the plurality of mounting supports being inserted into the plurality of mounting holes in a one-to-one corresponding manner, and the mounting plate is located in an inner side of the roller. The mounting supports are disposed at a bottom of the mounting plate and can be manufactured in an integrally formed manner with the mounting plate. The plurality of mounting supports are inserted into the plurality of mounting holes in a one-to-one corresponding manner to achieve connection between the base and the roller, such that the rocker assembly can drive the roller to rotate while driving the mounting plate to rotate.

In some embodiments, the housing assembly includes an upper cover and a lampshade which are detachably connected, the rocker assembly, the base, the roller, the light strip and the circuit module are all mounted on the lampshade. The lampshade is of a light-transmitting structure, when the light strip is in the wound state, the tape measure atmosphere lamp can be used for illumination through the lampshade so as to increase an illumination function when the light strip is wound. The lampshade can also provide a mounting space of the roller, such that the rocker assembly, the base, the roller, the light strip and the circuit module can all be mounted. The upper cover is connected with the lampshade, such that all the parts are protected without being exposed, and attractiveness can be improved. A detachable connection manner is employed between the upper cover and the lampshade, such that the tape measure type ambient lamp can be conveniently mounted or dismounted.

In some embodiments, a mounting shaft cylinder is disposed on an inner side of a bottom of the lampshade, a bearing is further mounted on the inner side of the roller, and the bearing is disposed outside the mounting shaft cylinder in a sleeving manner. The bearing can be conveniently mounted through the mounting shaft cylinder. The roller is disposed outside the bearing in a sleeving manner, such that the bearing bears torque, the roller can rotate relative to the lampshade, and the light strip can be conveniently unwound and wound.

In some embodiments, an end portion of the light strip is provided with a pull ring, an outer side of the housing assembly is provided with a buckle position, and when the light strip is completely retracted in the housing assembly, the pull ring is abutted against the buckle position. The pull ring can conveniently pull the light strip to be unwound, and when the light strip is stored in the housing assembly, the pull ring is abutted against the buckle position on an outer side of the housing assembly to play a limiting role, such that the situation that the light strip is excessively hidden and inconvenient to pull out when needed to be unwound is prevented. Specifically, the buckle position is disposed on an outer side of the lampshade.

The present disclosure has the beneficial effects as follows:

The handle is fixedly disposed on the rocker, such that the rocker and the base are limited at the same time. When the handle rotates, the base can be driven by the rocker to drive the roller to rotate, thereby unwinding or winding the light strip. When the rocker is turned over relative to the base by different angles, different functions can be achieved. When the rocker is turned over by 90° relative to the base, and the rocker and the base are in the perpendicular state, the tape measure atmosphere lamp can be suspended by means of the rocker, such that the function of the camping lamp can be achieved in the wound state of the light strip. The rocker continues being turned over, and when the rocker is turned over by 180° from the original position, the handle can be inserted into the base and get hidden in the housing assembly, such that the handle is also in the storage state, thereby facilitating carrying and storage of the tape measure atmosphere lamp.

Figure 1:
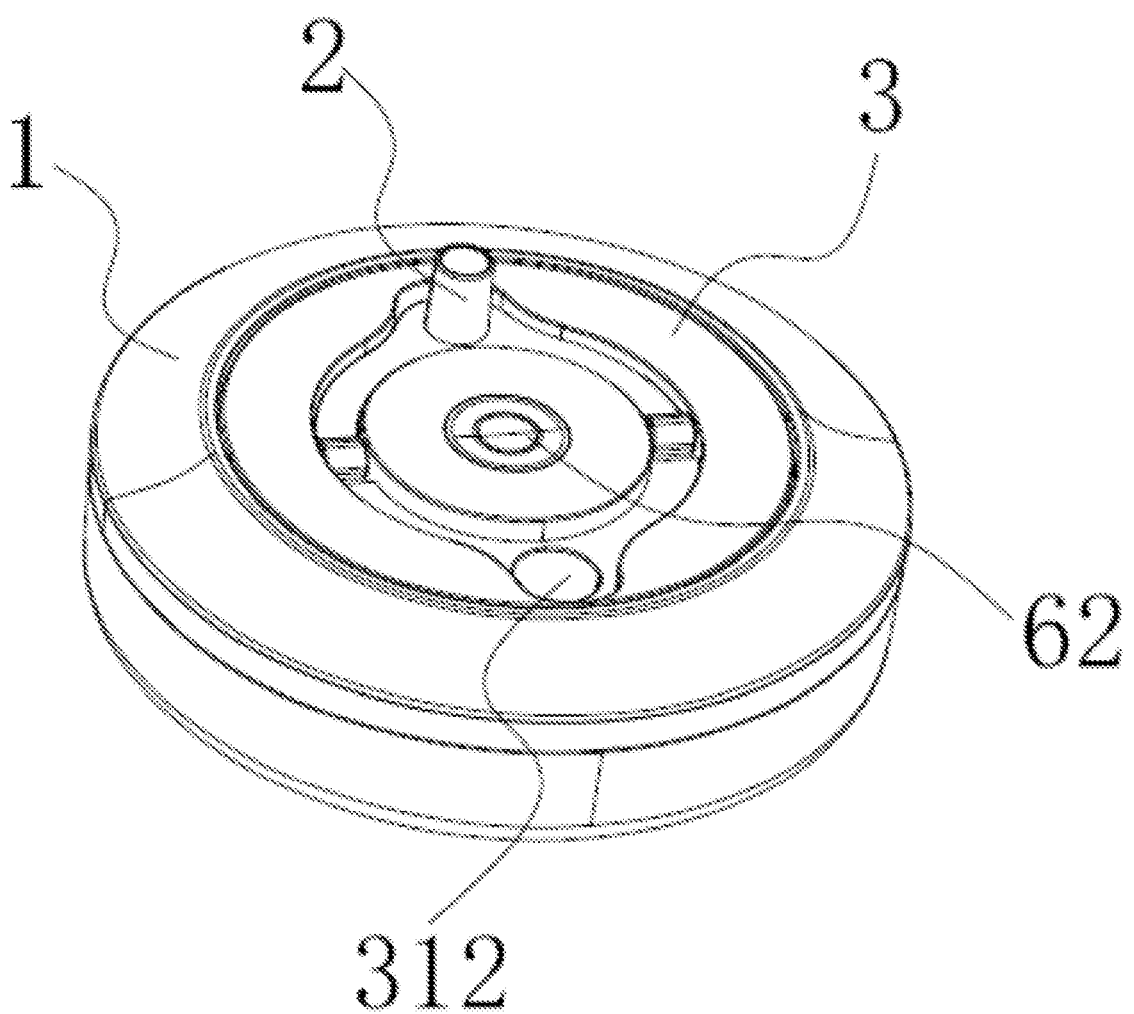
FIG. 1 illustrates a structural diagram of a tape measure atmosphere lamp of the present disclosure in a first usage state in a first direction.

Description of reference numerals are as follows:

1, housing assembly; 11, upper cover; 12, lampshade; 121, mounting shaft cylinder; 122, buckle position; 2, rocker assembly; 21, rocker; 211, second limiting portion; 22, handle; 3, base; 31, mounting recess, 311, first limiting portion; 312, through hole; 32, mounting plate; 33, mounting support; 4, roller; 41, mounting hole; 5, light strip; 51, pull ring; 61, circuit module; 62, functional key; 7, rotational shaft; 8, bearing; and 9, charging interface; 42, mounting cavity; 43, support plate.

DETAILED DESCRIPTION OF THE EMBODIMENTS

The accompanying drawings are only for illustrative description and are not to be construed as limiting the present patent. In order to better illustrate this example, some components of the drawings may be omitted, scaled up or scaled down, which do not represent the size of an actual product. For those skilled in the art, it is understandable that some well-known structures and their descriptions in the accompanying drawings may be omitted. The description of positional relationships in the accompanying drawings is only for illustrative description and is not to be construed as limiting the present patent.

The same or similar reference numerals in the accompanying drawings of the present disclosure correspond to the same or similar components. In the description of the present disclosure, it needs to be understood that the orientation or positional relationships indicated by the terms "up", "down", "left", "right", "long", "short", etc. are based on the orientation or positional relationships shown in the accompanying drawings, are merely for facilitating the description of the present disclosure and simplifying the description, rather than indicating or implying that a device or element referred to must have a particular orientation or be constructed and operated in a particular orientation, and therefore the expression describing the positional relationships in the accompanying drawings are merely for illustrative description and should not be interpreted as limiting the present disclosure. Those skilled in the art may understand the specific meanings of the above terms in accordance with specific conditions.

The technical solutions of the present disclosure will be further specifically described below with reference to the particular examples and in conjunction with the accompanying drawings.

Example 1

Figure 2:
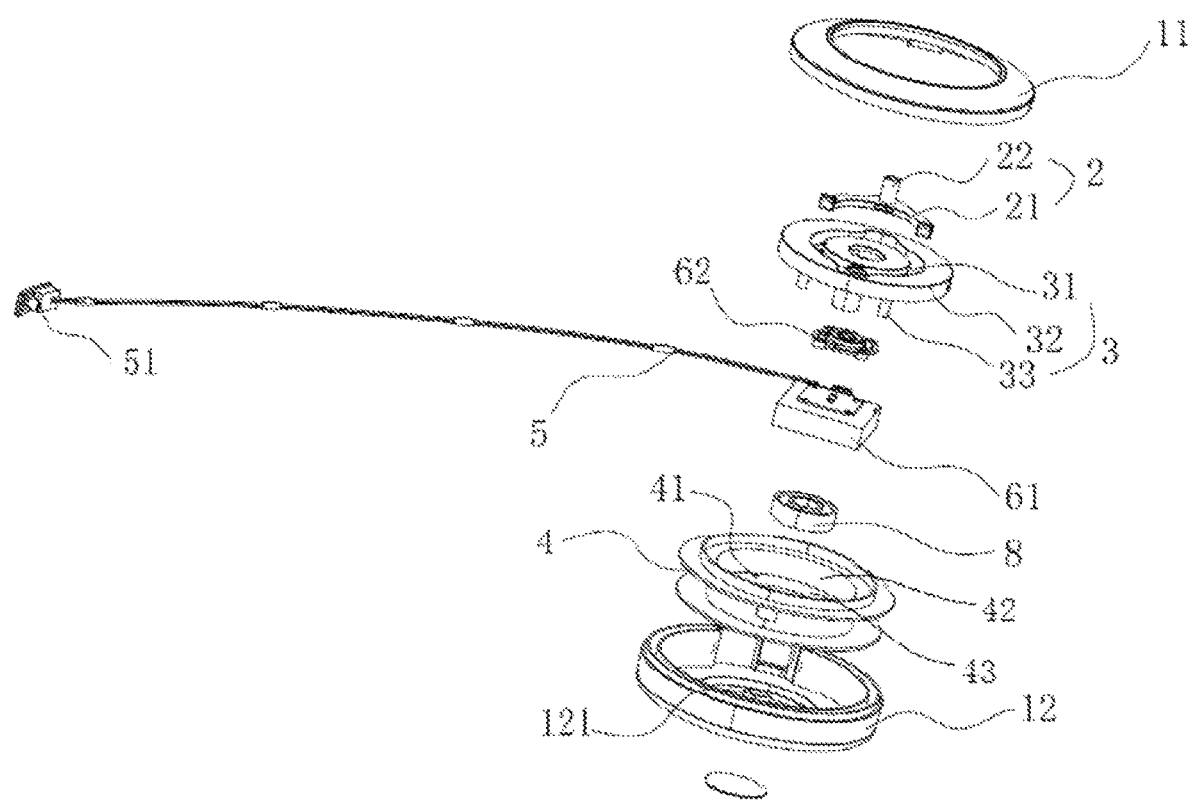
FIG. 2 illustrates an exploded structural diagram of a tape measure atmosphere lamp of the present disclosure.
Figure 3:
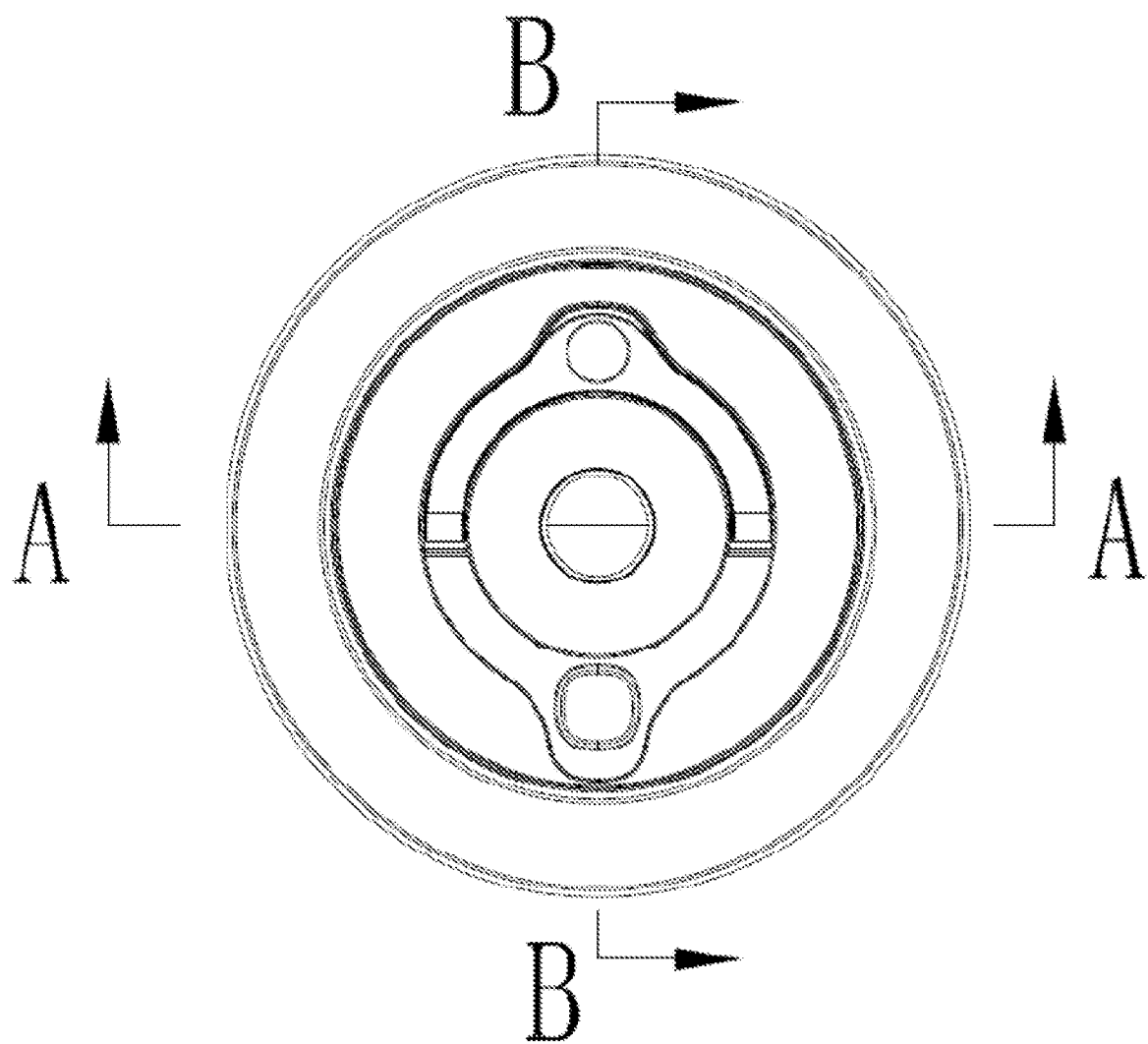
FIG. 3 illustrates a structural diagram of a tape measure atmosphere lamp of the present disclosure in a first usage state in a second direction.
Figure 4:
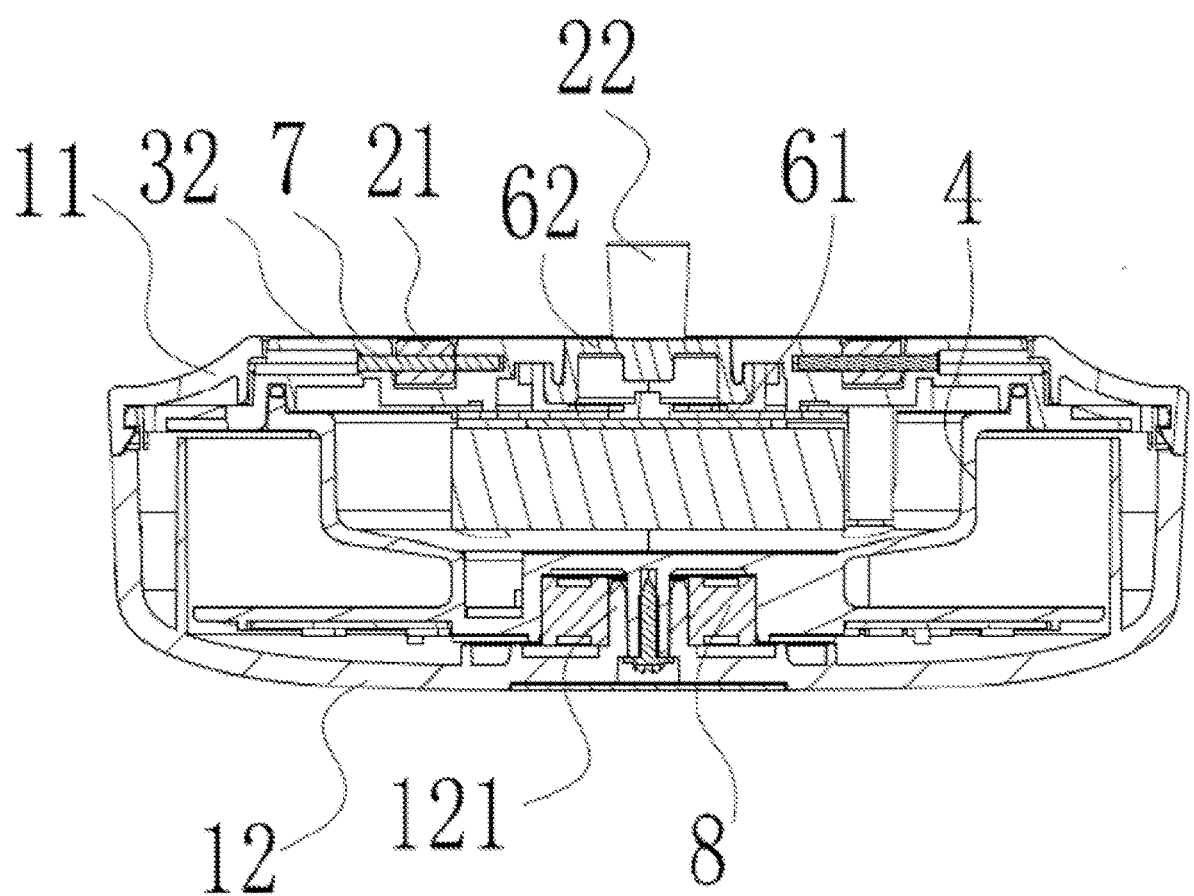
FIG. 4 illustrates a sectional view of FIG. 3 of the present disclosure in direction A-A.
Figure 5:
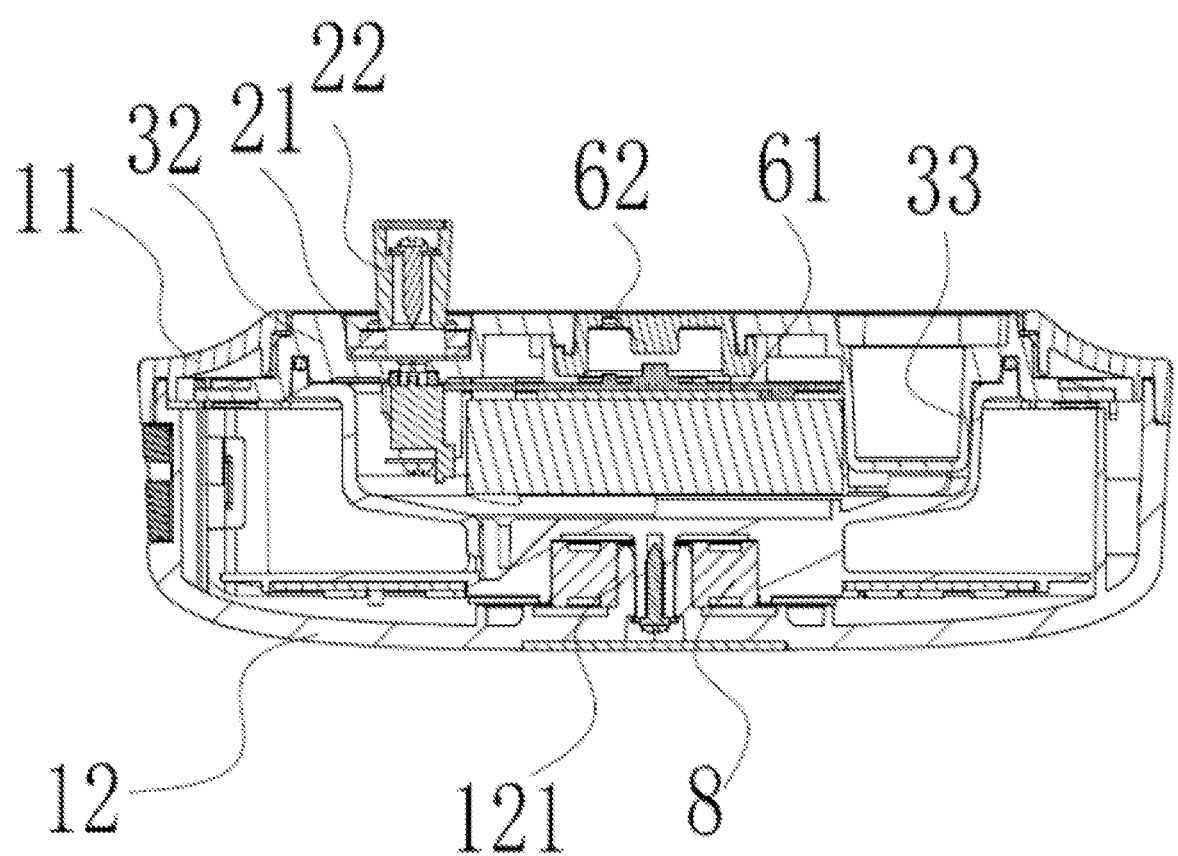
FIG. 5 illustrates a sectional view of FIG. 3 of the present disclosure in direction B-B.
Figure 6:
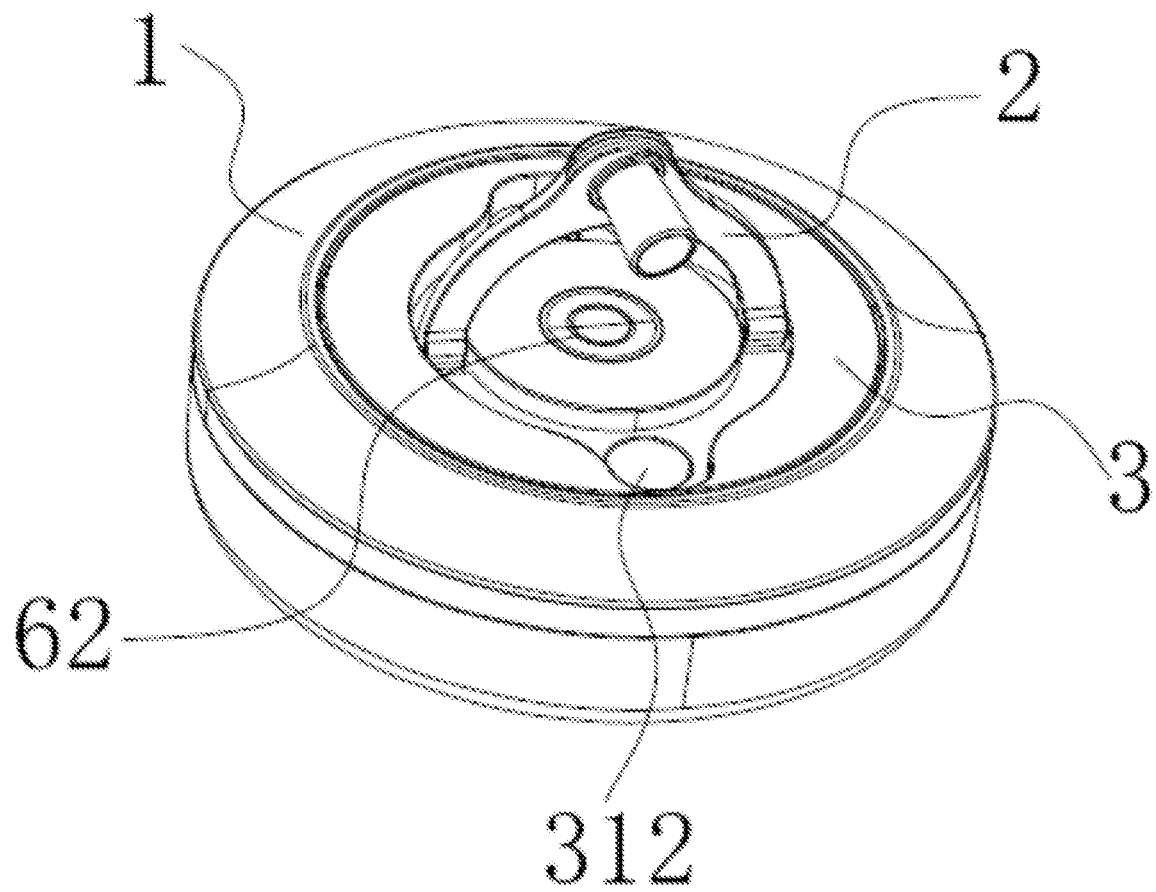
FIG. 6 illustrates a structural diagram of a tape measure atmosphere lamp of the present disclosure in a second usage state in a first direction.
Figure 7:
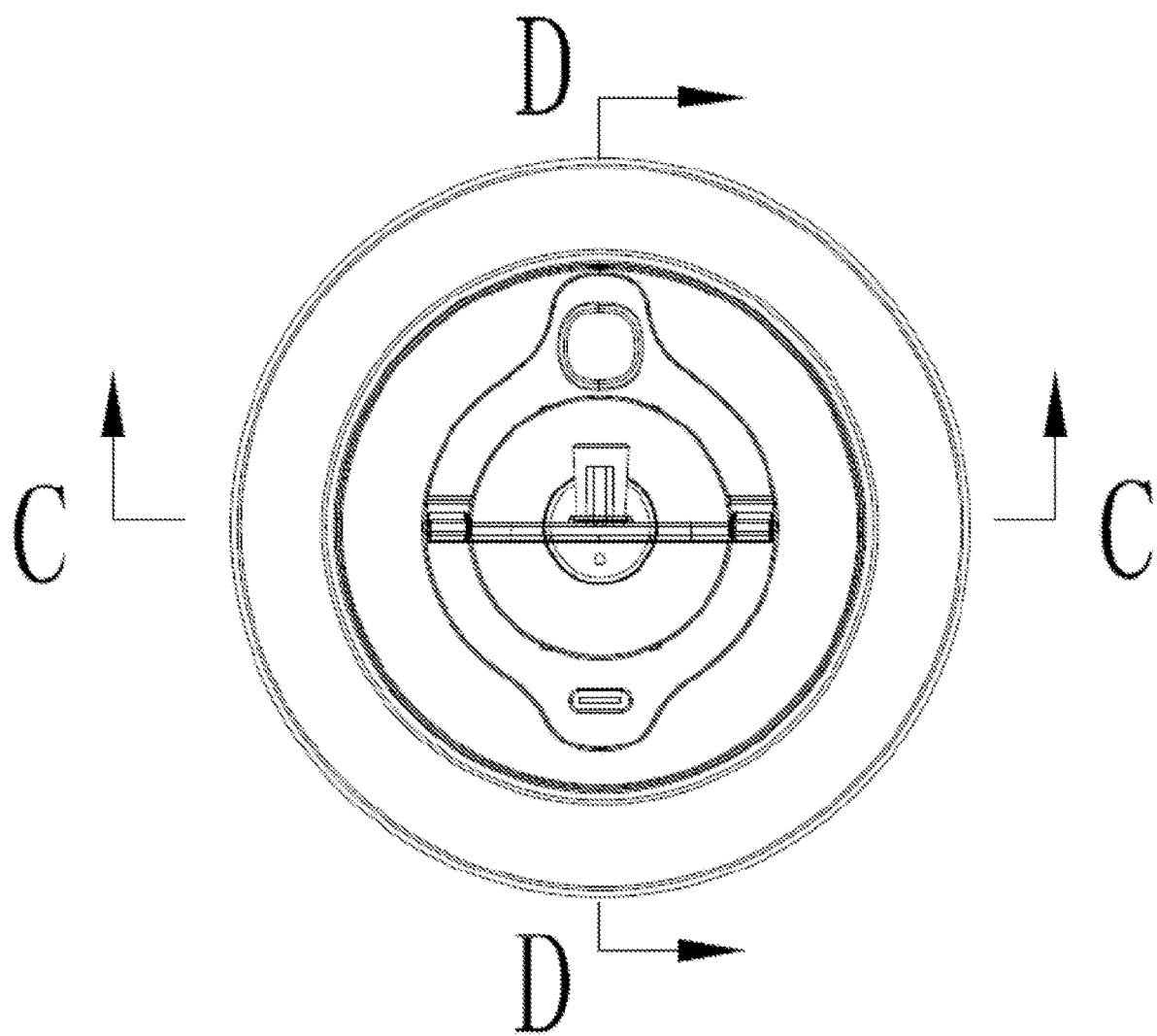
FIG. 7 illustrates a structural diagram of a tape measure atmosphere lamp of the present disclosure in a second usage state in a second direction.
Figure 8:
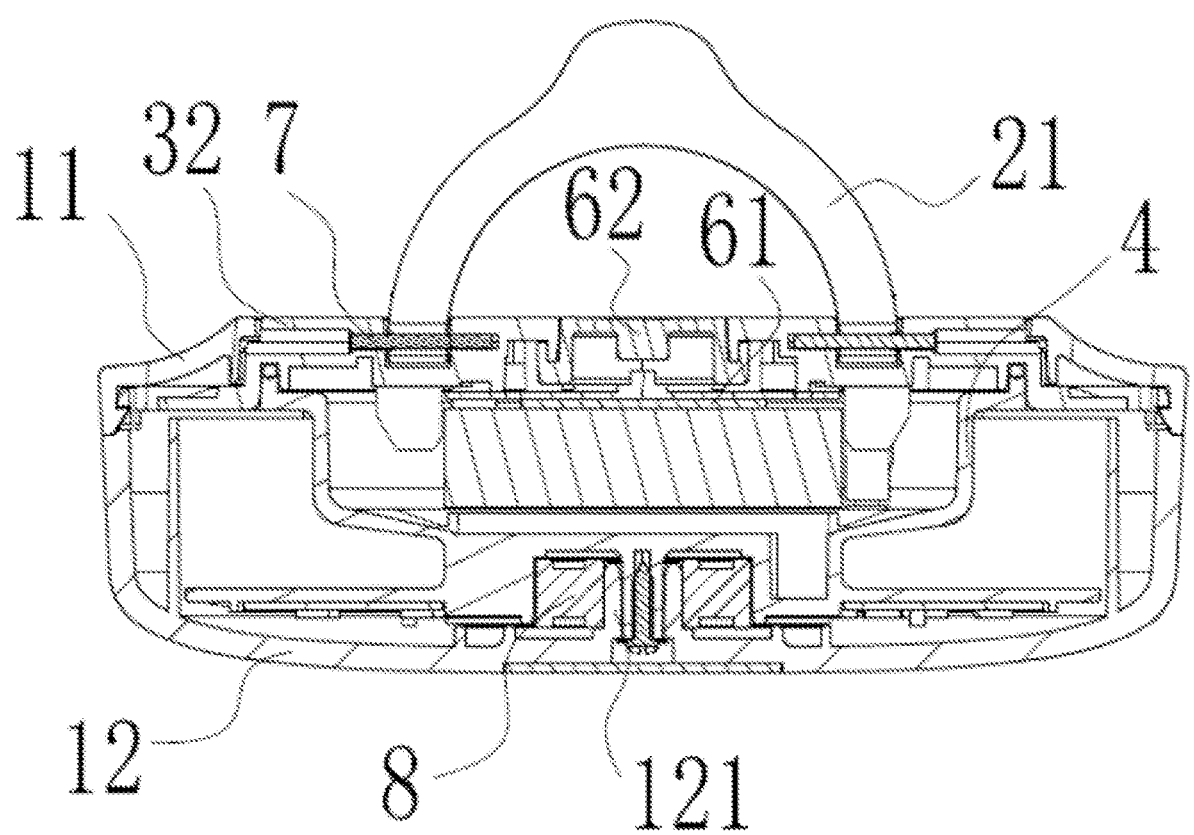
FIG. 8 illustrates a sectional view of FIG. 7 of the present disclosure in direction C-C.
Figure 9:
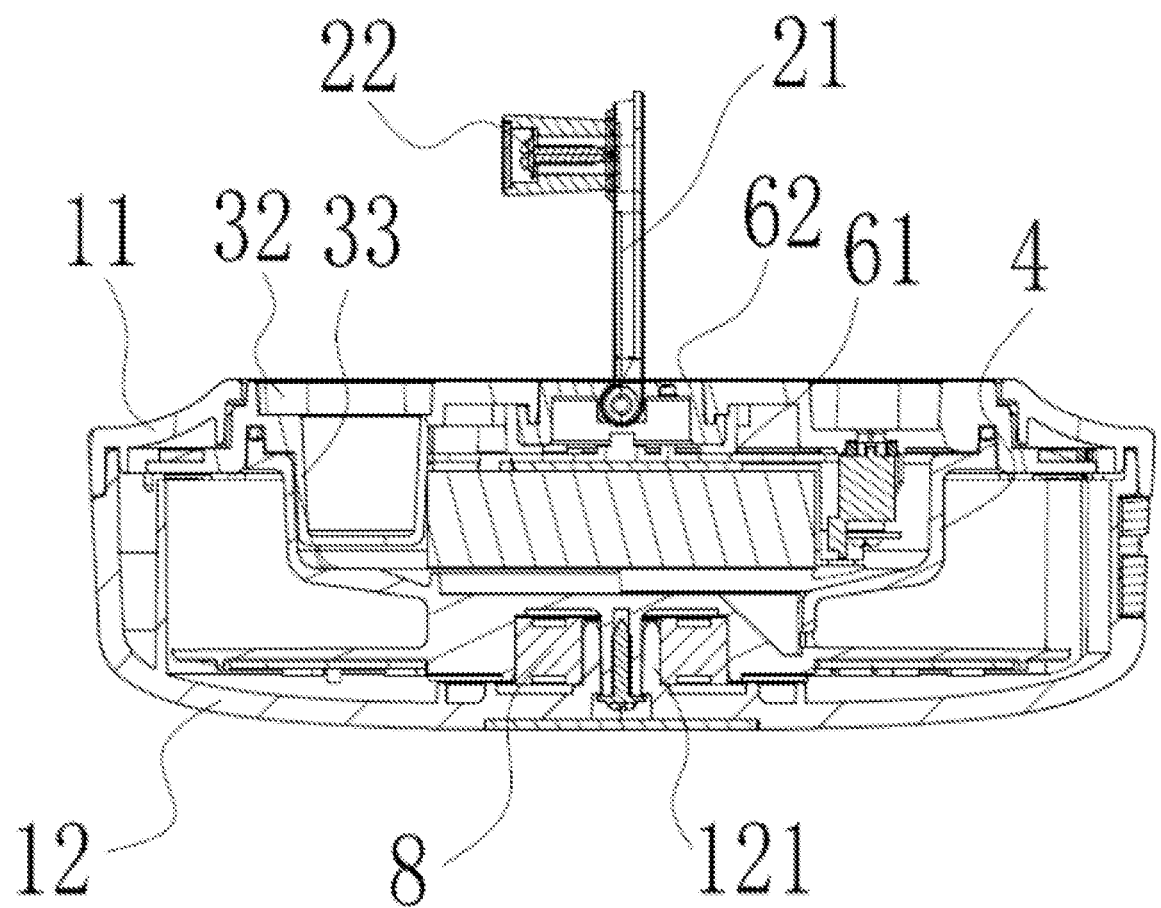
FIG. 9 illustrates a sectional view of FIG. 7 of the present disclosure in direction D-D.
Figure 10:
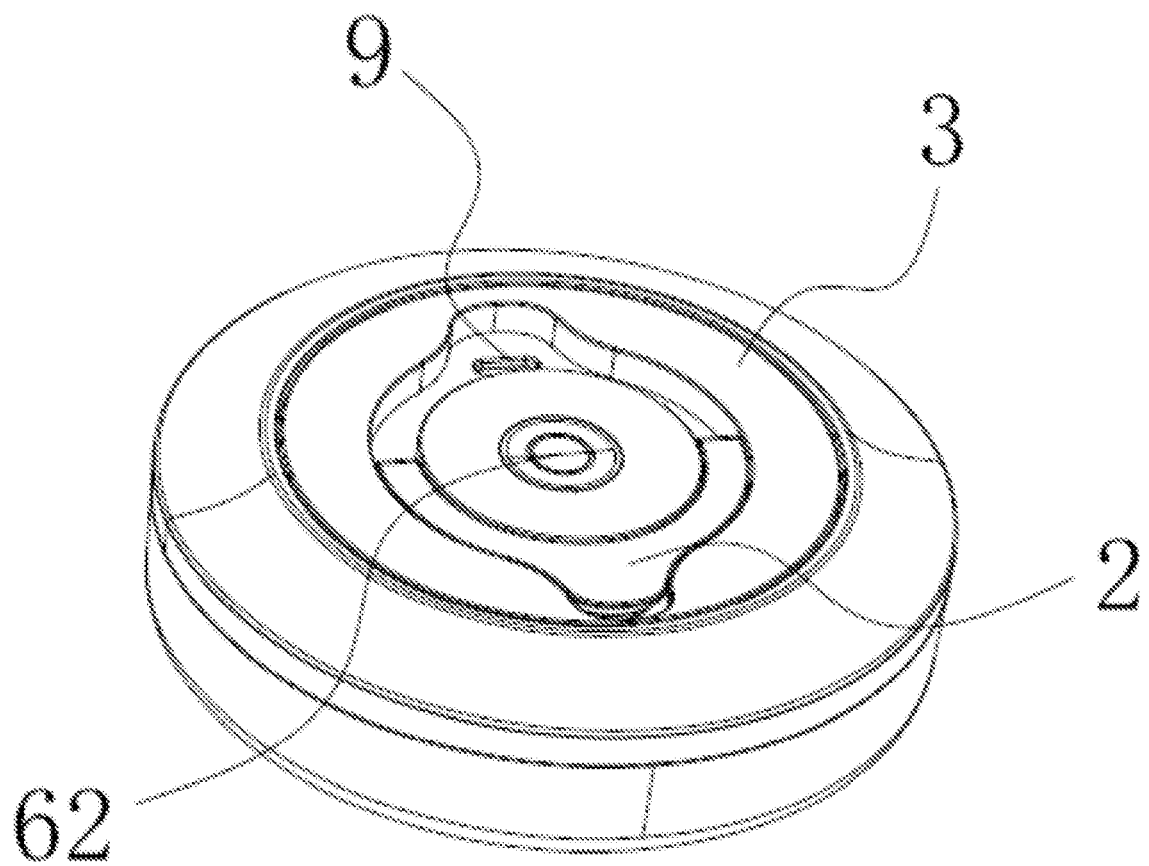
FIG. 10 illustrates a structural diagram of a tape measure atmosphere lamp of the present disclosure in a storage state in a first direction.
Figure 11:
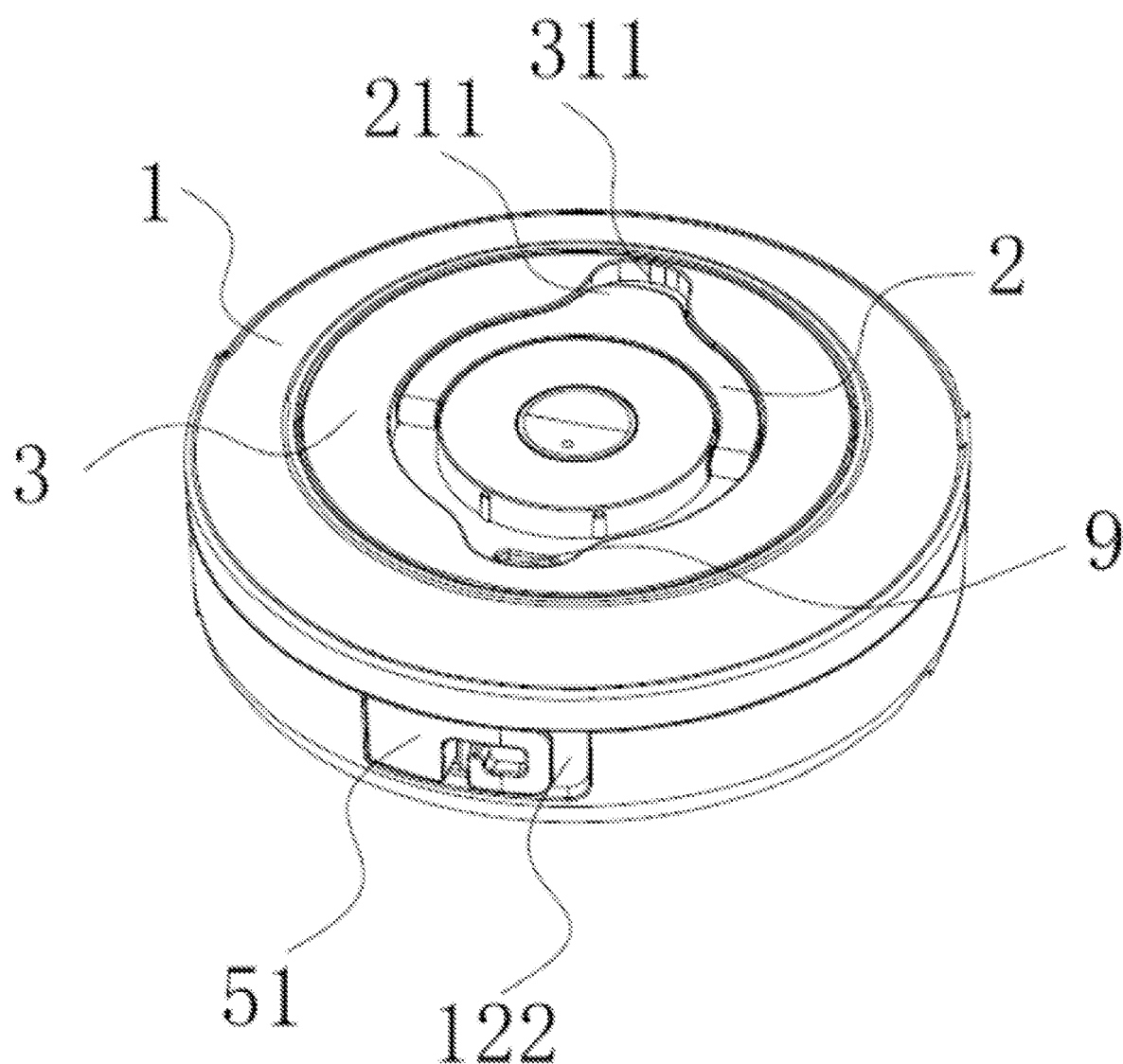
FIG. 11 illustrates a structural diagram of a tape measure atmosphere lamp of the present disclosure in a storage state in a second direction.

As shown in FIGS. 1-11, Example 1 of a tape measure atmosphere lamp includes a housing assembly 1, and a rocker assembly 2, a base 3, a roller 4, a light strip 5 and a circuit module 61, and the rocker assembly 2, the base 3, the roller 4, the light strip 5 and the circuit module 61 are mounted in the housing assembly 1, where the rocker assembly 2 is hinged to the base 3, the base 3 is fixedly connected with the roller 4, the roller 4 is rotationally connected with the housing assembly 1, the light strip 5 is wound in a circumferential direction of the roller 4, and the light strip 5 is electrically connected with the circuit module 61. The housing assembly 1 is configured to provide a mounting space for all parts (the all parts includes the rocker assembly 2, the base 3, the roller 4, the light strip 5 and the circuit module 61), and can protect the parts, thereby avoiding exposure of the parts. Moreover, the tape measure atmosphere lamp can form a whole so as to facilitate carrying and transportation. The light strip 5 is wound in the circumferential direction of the roller 4, and the light strip 5 can be unwound or wound by means of the rotation of the roller 4. Specifically, the roller 4 is mounted in the housing assembly 1, but is movably connected with the housing assembly 1, and the roller 4 can rotate relative to the housing assembly 1. The base 3 is mounted in an inner side of the roller 4, a top of the base 3 is flush with a top of the roller 4 or lower than the top of the roller 4, and the rocker assembly 2 is movably connected with the base 3. When the rocker assembly 2 is turned over relative to the base 3, the rocker assembly 2 can protrude out of or get hidden in the housing assembly 1. Since the base 3 is connected with the roller 4, when the rocker assembly 2 protrudes out of the housing assembly 1, rotating the rocker assembly 2 can drives the roller 4 to rotate by the base 3, such that the light strip 5 is extended or retracted relative to the housing assembly 1, thereby unwinding or winding the light strip 5. The rocker assembly 2 includes a rocker 21 and a handle 22, and the handle 22 is provided on the rocker 21. Specifically, the rocker 21 is of an arc-shaped structure, the handle 22 is mounted in a middle of the rocker 21, the handle 22 is perpendicular to the rocker 21, a mounting recess 31 is provided in the base 3, and the rocker 21 is mounted in the mounting recess 31. The tape measure atmosphere lamp includes a rotational shaft 7, and the rotational shaft 7 penetrates a middle of the base 3 in the circumferential direction and two ends of the rocker 21 for hinged connected with the base 3 and the rocker 21. The circumference of the mounting recess 31 is twice that of the rocker 21, and therefore, the rocker 21 occupies only part of the mounting recess 31. Furthermore, two first limiting portions 311 are symmetrically disposed in the mounting recess 31 with respect to a center of a centerline of the mounting recess 31, the two first limiting portions 311 are located at two ends of the mounting recess 31 respectively, a second limiting portion 211 corresponding to the first limiting portion 311 is disposed in the middle of the rocker 21, and the handle 22 is located at the second limiting portion 211. Moreover, a through hole 312 is provided on one of the two first limiting portions 311, and the through hole 312 for hiding the handle 22 after the handle 22 drives the rocker 21 to be turned over. When the rocker 21 is located at an original position, that is, when the rocker 21 and the base 3 are located on the same plane, the handle 22 protrudes out of the base 3 and also protrudes from the housing assembly 1. The rocker 21 is turned over by 90°, such that the rocker 21 is perpendicular to the base 3, in this case, the handle 22 is parallel to the base 3, the tape measure atmosphere lamp is in a suspended state and can be suspended through the rocker 21. The rocker 21 continues being turned over by 90°, such that the rocker 21 and the base 3 are on the same plane, in this case, the handle 22 can be inserted into the through hole 312 for hiding, and the handle 22 is in a complete storage state.

As an improved solution of this example, the base 3 includes a mounting plate 32 and a plurality of mounting supports 33, and the plurality of mounting supports 33 are provided at a bottom of the mounting plate 32. The mounting recess 31 is provided in the mounting plate 32, and the rocker assembly 2 is hinged to the mounting plate 32. A plurality of mounting holes 41 are provided in an inner side of a bottom of the roller 4, the base 3 is connected with the roller 4 by means of the plurality of mounting supports 33 being inserted into the plurality of mounting holes 41 in a one-to-one corresponding manner, and the mounting plate 32 is located in an inner side of the roller 4. The mounting supports 33 are inserted into the mounting holes 41 to achieve insertion connection between the mounting plate 32 and the base 3, such that when the rocker 21 rotates, the mounting plate 32 is driven to drive the roller 4 to rotate accordingly, thereby unwinding or winding the light strip 5. A charging interface 9 is further provided on the mounting plate 32, the charging interface 9 is located at the first limiting portion 311, and the charging interface 9 is electrically connected with the circuit module 61.

As an improved solution of this example, the housing assembly 1 includes an upper cover 11 and a lampshade 12 which are detachably connected, and the rocker assembly 2, the base 3, the roller 4, the light strip 5 and the circuit module 61 are all mounted on the lampshade 12. The lampshade 12 is of a light-transmitting structure. When the light strip 5 is in the wound state, the tape measure atmosphere lamp can be used for illumination through the lampshade 12, such that an illumination function is added when the light strip 5 is wound. The lampshade 12 can also provide a mounting space of the roller 4, such that the rocker assembly 2, the base 3, the roller 4, the light strip 5 and the circuit module 61 can all be mounted. The upper cover 11 is connected with the lampshade 12, such that all the parts are protected without being exposed, and attractiveness can be improved. A detachable connection manner is employed between the upper cover 11 and the lampshade 12, such that the tape measure atmosphere lamp can be conveniently mounted or dismounted. Specifically, a mounting shaft cylinder 121 is disposed on an inner side of a bottom of the lampshade 12, a bearing 8 is further mounted on the inner side of the roller 4, and the bearing 8 is disposed outside the mounting shaft cylinder 121 in a sleeving manner. The bearing 8 can be conveniently mounted through the mounting shaft cylinder 121. The roller 4 is disposed outside the bearing 8 in a sleeving manner, such that the bearing 8 bears torque, the roller 4 can rotate relative to the lampshade 12, and the light strip 5 can be conveniently unwound or wound.

As an improved solution of this example, the tape measure atmosphere lamp includes a functional key 62, and the functional key 62 is provided on the housing assembly 1 and exposed out of a surface of the housing assembly 1, and the functional key 62 is electrically connected to the circuit module 61.

In some embodiments, a mounting cavity 42 is provided in the roller 4, the tape measure atmosphere lamp includes a support plate 43 which is provided in the mounting cavity 42 and fixedly connected with the roller 4, wherein the plurality of mounting holes 41 are provided on the support plate 43; the mounting supports 33 are inserted into the mounting holes 41, and the mounting plate 32 is located in the mounting cavity 42.

The tape measure atmosphere lamp includes two rotational shafts 7, wherein each of the two rotational shafts 7 is respectively penetrated through both ends of the rocker 21 and hinged with the base 3; the two rotational shafts 7 are disposed at an interval along the radial direction of the base 3.

Furthermore, the mounting recess 31 is annular.

Example 2

As Example 2 of the tape measure atmosphere lamp, this example is similar to Example 1. Difference lies in that a side wall of the mounting recess 31 is attached with the rocker 21. Shapes and sizes of the mounting recess 31 and the rocker 21 are correspondingly limited, such that the side wall of the mounting recess 31 is attached with the rocker 21, and after the rocker 21 is turned over by a certain angle relative to the base 3, the relative positions of the rocker 21 and the base 3 can keep unchanged by means of the side wall of the mounting recess 31 is attached with the rocker 21. The rocker 21 can be turned over relative to the base 3 only by manually applying force to the rocker 21, such that the rocker 21 can be conveniently maintained in a state in which the rocker is perpendicular to the base 3, and the rocker 21 can serve as a hanging hook for hanging the tape measure atmosphere lamp. Certainly, within a cognitive range of those skilled in the art, a limiting component can also be disposed at the mounting recess 31 where the rocker 21 and the base 3 are located and perform limitation when the rocker 21 is perpendicular to the base 3, thereby maintaining the perpendicular state between the rocker and the base.

Example 3

This example is Example 3 of a tape measure atmosphere lamp. This example is similar to Example 1. Difference lies in that an end portion of the light strip 5 is provided with a pull ring 51, an outer side of the housing assembly 1 is provided with a buckle position 122, and when the light strip 5 is completely retracted in the housing assembly 1, the pull ring 51 is abutted against the buckle position 122. The pull ring 51 can conveniently pull the light strip 5 to be unwound. When the light strip 5 is stored in the housing assembly 1, the pull ring 51 is abutted against the buckle position 122 on an outer side of the housing assembly 1 to play a limiting role, such that the situation that the light strip 5 gets excessively hidden and is inconvenient to pull out when needed to be unwound is prevented. Specifically, the buckle position 122 is disposed on an outer side of the lampshade 12.

Apparently, the above examples of the present disclosure are merely instances given for clearly illustrating the present disclosure, and are not intended to limit the embodiments of the present disclosure. For those of ordinary skill in the pertained field, changes or variations in other forms may also be made on the basis of the above description. There are no need and no way to exhaust all the embodiments. Any modification, equivalent substitution, improvement, etc. made within the spirit and principles of the present disclosure should fall within the protection scope of the present disclosure.

What is claimed is:

1. A tape measure atmosphere lamp, comprising a housing assembly, a rocker assembly, a base, a roller, a light strip and a circuit module, wherein the rocker assembly, the base, the roller, the light strip and the circuit module are mounted in the housing assembly, the rocker assembly is hinged with the base, the base is fixedly connected with the roller, the roller is rotationally connected with the housing assembly, the light strip is wound in a circumferential direction of the roller, and the light strip is electrically connected with the circuit module; the rocker assembly is turned over relative to the base, such that the rocker assembly protrudes out of or gets hidden in the housing assembly; and the base and the roller are driven to rotate by rotating the rocker assembly, such that the light strip is extended or retracted relative to the housing assembly;

the rocker assembly comprises a rocker and a handle, the handle is provided on the rocker, a mounting recess is provided in the base, and the rocker is mounted in the mounting recess and is hinged to the base; the tape measure atmosphere lamp comprises a rotational shaft, the rocker is hinged to the base at a middle of the base by means of the rotational shaft;

two first limiting portions are symmetrically disposed in the mounting recess with respect to a center of a centerline of the mounting recess, the rocker is of an arc-shaped rod structure, a second limiting portion corresponding to the first limiting portions is disposed on the rocker, and the handle is located at the second limiting portion.

2. The tape measure atmosphere lamp as claimed in claim 1, wherein a through hole for hiding the handle after the handle drives the rocker to be turned over is provided at the first limiting portion away from the handle.

3. The tape measure atmosphere lamp as claimed in claim 1, wherein the base comprises a mounting plate and a plurality of mounting supports, wherein the plurality of mounting supports are provided at a bottom of the mounting plate, the mounting recess is provided in the mounting plate, the rocker is hinged to the mounting plate, a plurality of mounting holes are provided in an inner side of a bottom of the roller, the base is connected with the roller by means of the plurality of mounting supports being inserted into the plurality of mounting holes in a one-to-one corresponding manner, and the mounting plate is located in an inner side of the roller.

4. The tape measure atmosphere lamp as claimed in claim 3, wherein the housing assembly comprises an upper cover and a lampshade, wherein the upper cover and the lampshade are detachably connected, the rocker assembly, the base, the roller, the light strip and the circuit module are all mounted on the lampshade.

5. The tape measure atmosphere lamp as claimed in claim 4, wherein a mounting shaft cylinder is disposed on an inner side of a bottom of the lampshade, a bearing is mounted on the inner side of the roller, and the bearing is disposed outside the mounting shaft cylinder in a sleeving manner.

6. The tape measure atmosphere lamp as claimed in claim 1, wherein an end portion of the light strip is provided with a pull ring, an outer side of the housing assembly is provided with a buckle position, and when the light strip is completely retracted in the housing assembly, the pull ring is abutted against the buckle position.

7. The tape measure atmosphere lamp as claimed in claim 1, wherein a side wall of the mounting recess is attached with the rocker.

8. The tape measure atmosphere lamp as claimed in claim 1, wherein the base comprises a mounting plate and a plurality of mounting supports, wherein the plurality of mounting supports are provided at a bottom of the mounting plate, the mounting recess is provided in the mounting plate, the rocker is hinged to the mounting plate, a plurality of mounting holes are provided in an inner side of a bottom of the roller, the base is connected with the roller by means of the plurality of mounting supports being inserted into the plurality of mounting holes in a one-to-one corresponding manner, and the mounting plate is located in an inner side of the roller.

9. The tape measure atmosphere lamp as claimed in claim 1, wherein the base comprises a mounting plate and a plurality of mounting supports, wherein the plurality of mounting supports are provided at a bottom of the mounting plate, the mounting recess is provided in the mounting plate, the rocker is hinged to the mounting plate, a plurality of mounting holes are provided in an inner side of a bottom of the roller, the base is connected with the roller by means of the plurality of mounting supports being inserted into the plurality of mounting holes in a one-to-one corresponding manner, and the mounting plate is located in an inner side of the roller.

10. The tape measure atmosphere lamp as claimed in claim 2, wherein the base comprises a mounting plate and a plurality of mounting supports, wherein the plurality of mounting supports are provided at a bottom of the mounting plate, the mounting recess is provided in the mounting plate, the rocker is hinged to the mounting plate, a plurality of mounting holes are provided in an inner side of a bottom of the roller, the base is connected with the roller by means of the plurality of mounting supports being inserted into the plurality of mounting holes in a one-to-one corresponding manner, and the mounting plate is located in an inner side of the roller.

11. The tape measure atmosphere lamp as claimed in claim 3, wherein a mounting cavity is provided in the roller, the tape measure atmosphere lamp comprises a support plate which is provided in the mounting cavity and fixedly connected with the roller, wherein the plurality of mounting holes are provided on the support plate; the mounting supports are inserted into the mounting holes, and the mounting plate is located in the mounting cavity.

12. The tape measure atmosphere lamp as claimed in claim 3, wherein a charging interface is provided on the mounting plate, and the charging interface is connected with the circuit module.

13. The tape measure atmosphere lamp as claimed in claim 1, wherein the tape measure atmosphere lamp comprises a functional key, and the functional key is provided on the housing assembly and exposed out of a surface of the housing assembly, and the functional key is electrically connected with the circuit module.

14. The tape measure atmosphere lamp as claimed in claim 1, the tape measure atmosphere lamp comprises two rotational shafts, wherein each of the two rotational shafts is respectively penetrated through both ends of the rocker and hinged with the base.

15. The tape measure atmosphere lamp as claimed in claim 14, wherein the two rotational shafts are disposed at an interval along the radial direction of the base.

16. The tape measure atmosphere lamp as claimed in claim 1, wherein the mounting recess is annular.

17. The tape measure atmosphere lamp as claimed in claim 1, wherein a through hole is provided on the first limiting portion, and the handle inserted into the through hole after the rocker being turned over.

* * * * *